United States Patent [19]

Sheem et al.

[11] Patent Number: 5,287,424
[45] Date of Patent: Feb. 15, 1994

[54] OPTICAL FIBER COUPLER WITH OVERLAPPING CORE-EXTENSIONS, AND MANUFACTURING METHODS OF THE SAME

[76] Inventors: Sang K. Sheem; Susan K. Sheem, both of P.O. Box 2141, Livermore, Calif. 94551-2141

[21] Appl. No.: 908,466

[22] Filed: Jul. 6, 1992

[51] Int. Cl.[5] .............................................. G02B 6/26
[52] U.S. Cl. .................................... 385/39; 385/31; 385/33; 385/50; 385/51; 264/1.5
[58] Field of Search .................... 385/39, 43, 146, 133, 385/31, 33, 34, 49, 50, 51, 52; 264/1.5, 1.4, 152

[56] References Cited

U.S. PATENT DOCUMENTS

| | | | |
|---|---|---|---|
| 3,819,249 | 6/1974 | Borner et al. | 385/39 |
| 4,067,937 | 1/1978 | Unno et al. | 264/1.5 |
| 4,264,126 | 4/1981 | Sheem | 385/30 |
| 4,566,753 | 1/1986 | Manschke | 385/46 |
| 4,632,513 | 12/1986 | Stowe et al. | 385/11 |
| 4,668,445 | 5/1987 | Calvet et al. | 264/1.5 |
| 4,798,438 | 1/1989 | Moore et al. | 385/43 |
| 4,842,359 | 6/1989 | Imoto et al. | 385/46 |
| 4,898,450 | 2/1990 | Jannson et al. | 385/50 |
| 4,904,042 | 2/1990 | Dragone | 385/46 |
| 4,946,239 | 8/1990 | Garmon | 385/43 |
| 4,950,045 | 8/1990 | Brichenno et al. | 385/24 |
| 4,961,617 | 10/1990 | Shahidi et al. | 385/31 |
| 5,169,677 | 12/1992 | Sangyoji et al. | 264/1.5 |

*Primary Examiner*—Frank Gonzalez
*Assistant Examiner*—Stephen W. Barns

[57] ABSTRACT

The basic embodiment of the present invention comprises an optical fiber having cores and a claddings, and core-extensions, wherein the individual core-extensions are built onto the core end facets in a shape of the diverging horn-like structure, with the sectional area increasing gradually as the individual core-extensions extend farther away from the core end facets to merge together and form a common core-extension for light mixing and coupling. The core-extension may be made of a photo-reactive material to be shaped after the diverging radiation pattern of light emitted from the core end facets.

19 Claims, 17 Drawing Sheets

OPTICAL FIBER COUPLER WITH OVERLAPPING CORE-EXTENSIONS, AND MANUFACTURING METHODS OF THE SAME

BACKGROUND OF THE INVENTION

The most common optical waveguide is the fiber with a round-shaped core supported by a round-shaped cladding. The next common optical waveguide is a planarized waveguide in which light-guiding channels are fabricated near the surface of an usually right-angled optical substrate. Guided light resides mostly inside the core. The sectional dimension of the fiber core is typically less than ten microns (0.01 mm) in single-mode fibers, and usually less than 200 microns even in the multimode fibers. Accordingly, connecting and coupling (mixing) of light between two or more fibers present enormous technical challenge. As a result, the prices for connectors and couplers for optical fibers are quite expensive, especially when compared to the counterpart components for microwave cables. Since the connectors and couplers are among the most frequently used components in the optical fiber communication, the high component price has impeded the expansion of the optical fiber communication into the broader applications, such as picture-phone, computer networking, and cable television.

Planarized waveguides are patterned on the flat top surface of a bulk optical substrate using microlithography. Accordingly, many of the useful optical functions, such as core tapering and light coupling, may be realized on planarized waveguides.

On the other hand, the fiber is drawn from molten glass or plastic materials into a hair size and shape at a high speed. Accordingly, it is not easy to incorporate tapering and light coupling functions into the optical fiber body. To make a fiber coupler, it is necessary to perform an additional fabrication with strands of fiber. The first multimode fiber star coupler or light mixer available in early 1970's comprises one linear array of fibers butted against the one side of a narrow and long rectangular cavity, and the other linear array butted against the opposite side of the cavity. Light from any of the fibers spreads inside the cavity while propagating the long length, and uniformly illuminates the array of the fibers on the opposite side. Advantage of this coupler is the simple construction and wavelength independence of the coupling ratio. The drawback of such a fiber star coupler is that the core occupies only a fraction of the sectional area due to its roundness and the existence of the cladding around each core. Accordingly the excess loss, due to the so-called packing density factor, is inherently high even with multimode fibers, and cannot be used at all for the single-mode fibers due to the extremely small core-to-cladding area ratio, which is about one to a hundred.

An alternative approach, so-called biconical fused coupler, was used from early 1970's for multimode fibers, in which fibers are twisted, thermally softened, and pulled very slowly, until the light guided in the core leaks out of the core into the cladding due to the size decrease in the pulled-and-fused area. Once the light resides in the cladding area it is freely spread into the claddings of other neighboring fibers, that have been fused together in the pulling process. The cladding modes return to the cores as the fiber sizes increase in the second half of the fused section. This process relies on the taper being gradual and smooth, ensuring an adiabatic mode transformation between the core modes and cladding modes. As the single-mode fiber began its dominance over the multimode fiber in the interferometric fiber sensor area starting about 1975, the requirement for single-mode coupler emerged. However, the processing technology of the biconical fused coupler mentioned above was not good enough to produce single-mode fiber coupler in that period. The first published single-mode star coupler was made by Sang K. Sheem, one of the inventors of the present invention disclosure, by twist-and-etch technique, as disclosed in U.S. Pat. No. 4,264,126. For a few years in the late 1970's, this coupler was the only single-mode fiber coupler available. However its use was limited only to the laboratory environment, because it was very difficult to ruggedize the coupler either by an epoxy potting or thermal fusing of etched fibers. The outputs kept oscillating between fibers during the ruggedization process, and the final split ratio was rather unpredictable.

In the early 1980's, the single-mode fiber displaced the multimode fibers almost completely in the fiber optic market. The industry kept improving the biconical fused coupler technique until it became good enough even for the single-mode fibers. A series of invention disclosures have been made along the way, for example in U.S. Pat. Nos. 4,798,438, 4,842,359 of Imoto, et. al., and 4,961,617 of Shahidi, which use the fused-tapered technique in modified forms. However it has remained as a very delicate process, especially when the number of the input or output fibers exceeds two. The largest number of ports for single-mode fiber couplers available today have four inputs and four outputs, or so-called (4×4), and one input and seven outputs (1×7). To get a larger channel numbers, a number of (2×2) couplers are cascaded. This results in a extensive labor and high price.

The two kinds of single-mode fiber coupler embodiments mentioned above, the twist-and-etch coupler and the biconical fused coupler, which are sometimes called all-fiber couplers, inherently suffer from wavelength and polarization dependence of the coupling ratio due to the interferometric nature of the coupling mechanism. The dependence may be reduced by making the path lengths of the member fibers as equal as possible, and minimizing any factor that destroys the circular symmetry of the sectional shape or internal strain in the coupling region.

As an alternative approach, light coupling may be performed by optical channel waveguides fabricated on a bulk optical substrate. Examples of such a coupler design and its variations include U.S. Pat. Nos. 4,566,753 of L. Manscheke, 4,653,845 of Y. Tremblay and et. al., 4,904,042 of C. Dragone, 4,950,045 of T. Brichenno. This method of using planarized waveguides, being the most expensive way, is employed almost exclusively for fabricating single-mode fiber couplers with the number of input/output ports larger than (4×4) or (1×7). The production process involves the fabrication of the planarized channel waveguides, then cutting and polishing the end facets of the substrate to make them flat, smooth, and sharply cornered at the connecting interface, then aligning ten-micron fiber cores to the several-micron waveguides in an end-butt fashion with better than one or two micron accuracy, and then gluing down the fibers in the aligned positions, and making sure that the fibers do not move more than one or two microns while the glue is being cured. The difficulty of the tedious process steps is reflected in the high price of such a single-mode fiber star coupler.

Thus, there is a keen need to devise an embodiment for manufacturing multi-port fiber couplers, especially for the single-mode, that does not require these tedious fabrication and piecewise assembly steps.

SUMMARY OF THE PRESENT INVENTION

Accordingly, it is the primary objective of the present invention to devise a novel optical interface embodiment that resolves the technical difficulties in manufacturing optical fiber couplers, especially for single-mode fibers.

It is an accompanying objective of the present invention to make the cost of optical fiber couplers low enough even for the low-density, low-end optical fiber communication applications.

The basic element of the present invention comprises an optical fiber having a core and a cladding, and a core-extension, wherein the core-extension is built upon the core end facet in a shape of the diverging horn-like structure. The core-extension is built as an independent structure, instead of being built on a bulk optical substrate and brought in for a tedious optical connection with fibers. The core-extension extends the waveguide effect substantially beyond the end facet of the core, with its sectional area increasing gradually as it extends further from the waveguide end facet. The index of refraction of the core-extension is larger than that surrounding the core-extension so that the light entering the core-extension with a proper input angle is confined within the core-extension while propagating. The sectional dimension of the core-extension at the far end is much larger than that of the core, which makes the light connection and coupling much easier in terms of the beam coupling tolerance in the transverse plane.

The basic coupler embodiment of the present invention comprises a plurality of cores, each core having an above-mentioned core-extension, that are laid in proximity and substantially in parallel so that the neighboring core-extensions gradually merge together at a distance, forming one common core-extension. The overlap region then works as light mixing area for light coupling and splitting. Tubings, rods, lenses, mirrors and other optical components may be added to the coupler embodiment to enhance the light mixing function.

In order to achieve the objective of the price affordability, the fabrication should be easy and simple. The present invention discloses simple fabrication methods. In one method, the core-extension is fabricated by immersing the end facet of a fiber waveguide in a photo-reactive material, such as light-curable or light-polimerizable ones, and then injecting a light of a proper wavelength and intensity into the opposite end facet of the waveguide so that the light radiating out of the end facet exposes photo-reactive material within the envelope of the diverging radiation pattern, forming the desired core-extension.

DETAILED DESCRIPTION

Figures 1, 2:
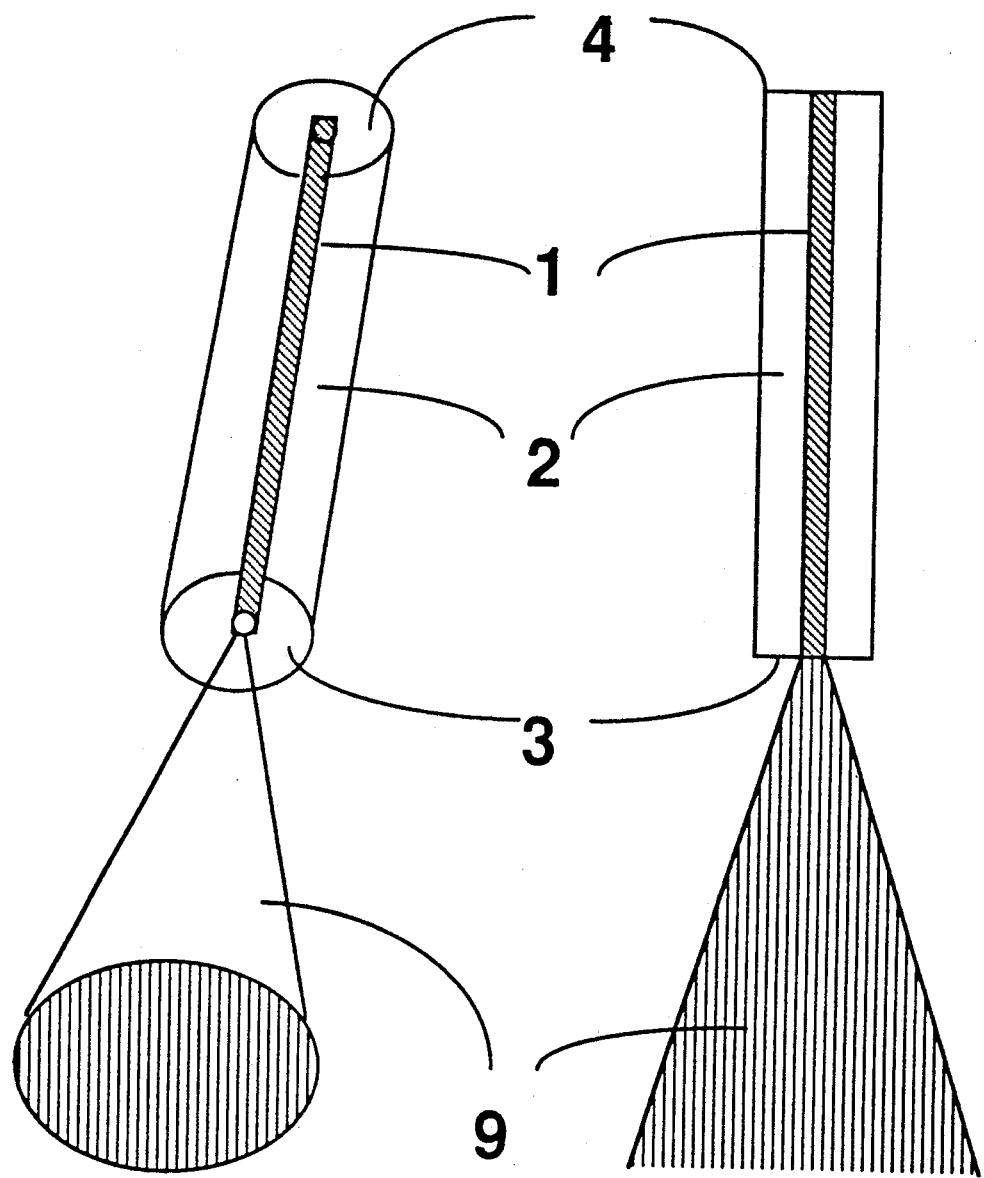
FIG. 1 shows a perspective view of an optical fiber having a core and an individual core-extension attached to the one end of the core.
FIG. 2 shows the plan view of the embodiment of FIG. 1.

In FIG. 1 is shown an optical fiber, with a core 1, a cladding 2, two end facets 3 and 4, and an individual core-extension 9. FIG. 2 shows the side view of the embodiment shown in FIG. 1. The core has an index of refraction higher than the cladding so as to confine the light within the core. The most widely used is so-called the single-mode fiber operating at 1.3 or 1.55 microns (micron=0.001 mm) wavelength, and has a diameter of nine microns. This fiber represents over 90% of the sales volume in the commercial optical fiber market. The cladding is typically 125 microns in diameter. However, in the present invention, the cladding may be chemically etched down to make the diameter smaller and thus to enhance the overlap of the neighboring core-extensions. The need for the overlap will be clarified in the next paragraph. Onto one end of the core 1 is built a diverging, horn-like structure 9, which will be called "core-extension" in the present invention.

The present invention may be applied to any optical waveguides and fiber-like transmission media. Accordingly, the term "fiber" should be interpreted in the present invention as representing all the optical waveguides with guiding cores or channels, and supporting cladding or substrate.

Figure 3:
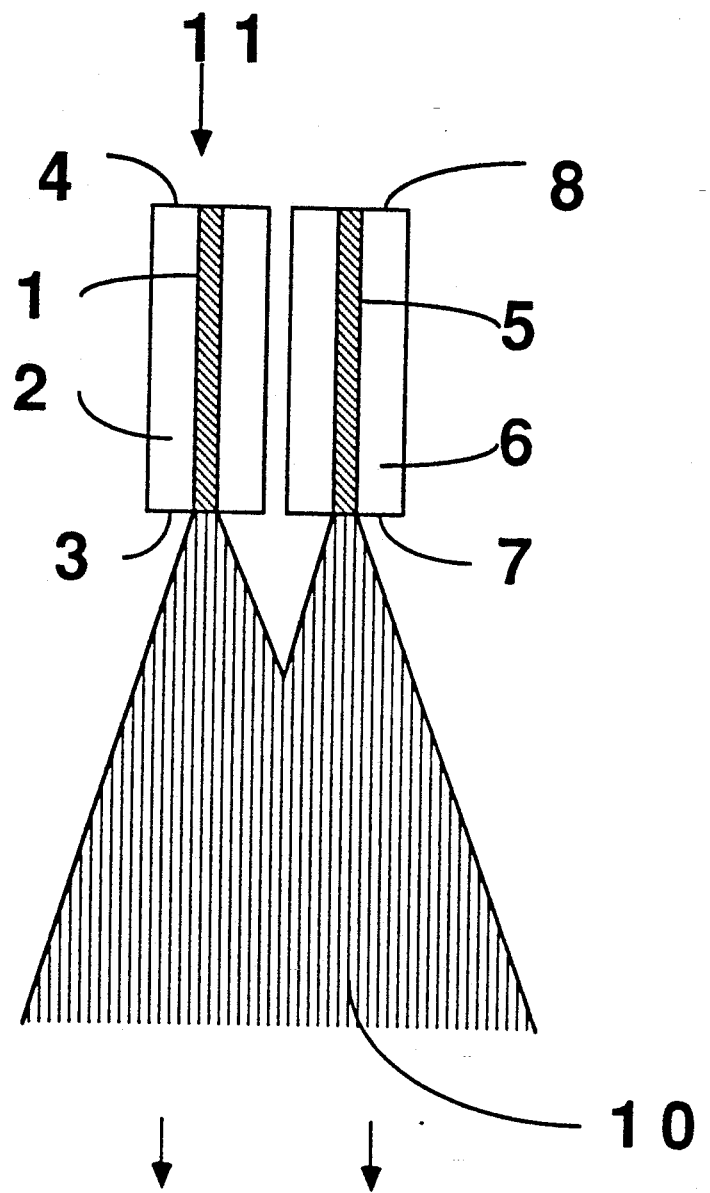
FIG. 3 shows the plan view of two fibers with the individual core-extensions that merge and form a common core-extension for light mixing and coupling.

The core-extension 9 of the present invention is about as narrow as the core 1 at the interface on the end facet 3, and diverges out as it 9 extends away from the end facet 3. The maximum diameter of the core extension 9 is larger than the cladding diameter, as indicated in FIG. 2. This specification is necessary in the present invention because one core extension, as shown in FIG. 3, should be able to overlap with the neighboring core-extension and form a light mixing region 10. In FIG. 3 two fibers are closely laid side-by-side, and the individual core-extensions start at the core end facets as two separate bodies, but merge at a distance to form a common core-extension 10. Accordingly, a light 11 entering the core 1 will emerge from the coupling region 10.

Figure 4:
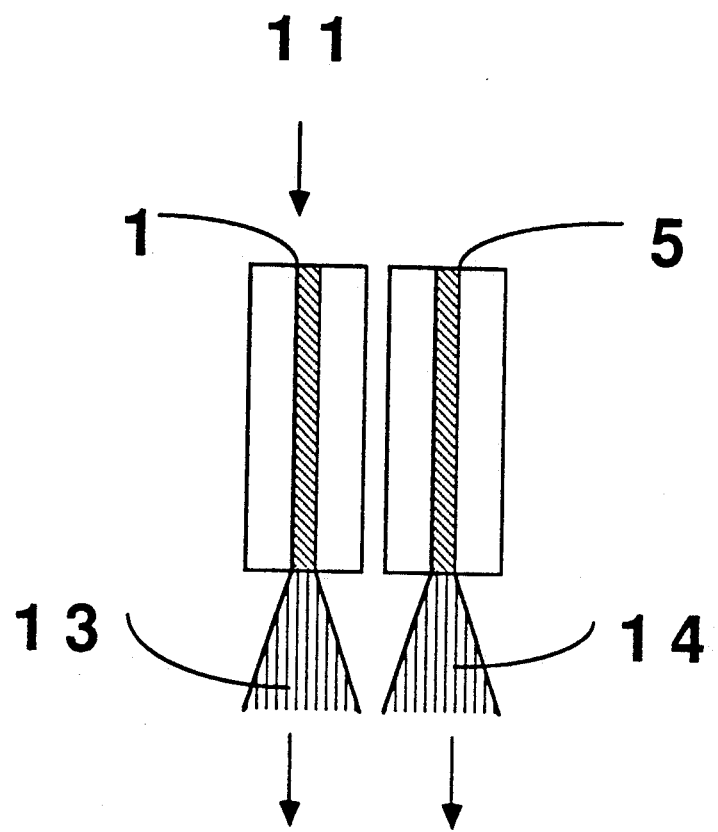
FIG. 4 shows the plan view of two fibers with two core-extensions, which are too short to form a common light mixing and coupling region.

If the maximum diameters of the individual core extensions are narrower than the distance between the two cores 1 and 5, as indicated in FIG. 4, the two cores 1 and 5 will have two separated core-extensions 13 and 14, and will not be able to form a common coupling for the cores 1 and 5.

It is worthwhile to note that the light mixer embodiment shown in FIG. 3 works also as a light power divider when a light enters from the core-extension side: The light, for example from a laser, will be coupled to the two cores 1 and 5.

The core-extension of the present invention is built on the fiber core end facet as an independent structure, unlike the channel waveguides that are first fabricated as a small part of a bulk optical substrate and then brought to the fiber end facet for optical connection, as seen in the prior inventions such as U.S. Pat. No. 4,566,753 of L. Manscheke, 4,653,845 of Y. Tremblay and et. al., 4,904,042 of C. Dragone, 4,950,045 of T. Brichenno. As mentioned above in "BACKGROUND OF THE INVENTION", the channel waveguides perform the function of optical mixing for multi-port fiber couplers, but create a tedious task, namely multi-step, multi-fiber optical interconnection. The main purpose of the present invention is to devise an embodiment that perform the optical mixing for multi-port fiber couplers, without creating such a tedious optical interconnection task, especially for the single-mode fibers.

The core-extensions described above may be made of a photo-reactive material the physical characteristics of which is influenced and transformed by a light exposure. Then the core-extensions can be fabricated by exposing the material with lights being emitted from the core end facets that diverge into a horn-like shape. In other words, the core-extensions occupy the space defined by the diverging radiation patterns of the light being emitted from the end facets of the cores. The individual radiation patterns extend beyond the core end facets over a sufficient distance, thus merging together to form a overlapping region, namely the common core-extension and clarified further when the method inventions are disclosed below.

Figure 5:
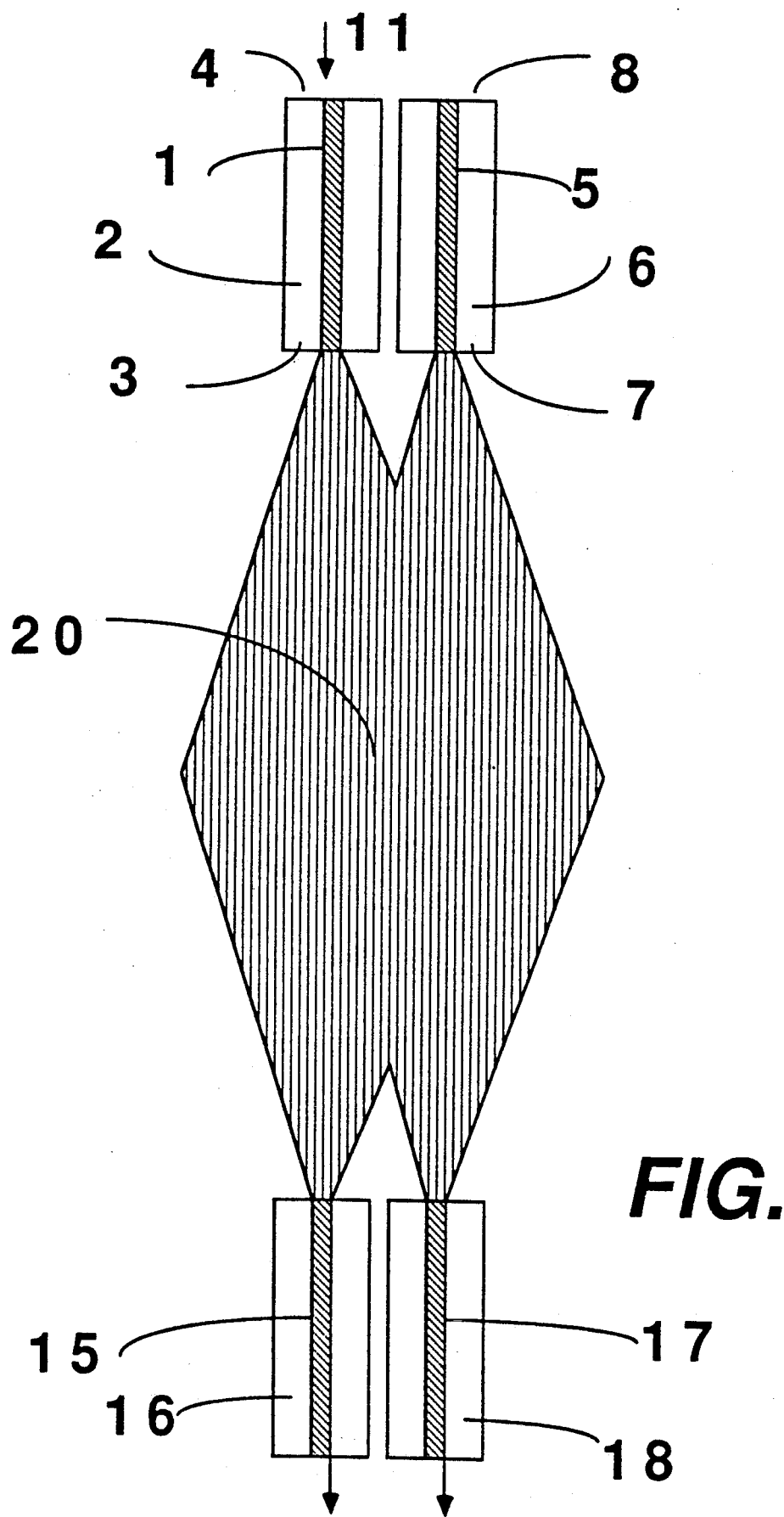
FIG. 5 shows two of the embodiments shown in FIG. 3 mated at the far end of the common core-extensions in a face-to-face fashion so as to allow the light from the fibers on one side is coupled to those on the other side.

A complete fiber-to-fiber coupler embodiment is constructed by mating the light mixing element shown in FIG. 3 with its own mirror-image duplicate, as shown in FIG. 5, at the far end of the common core-extension 10. The common core-extension 20 works as a light mixing or coupling region for the cores 1, 5, 15, and 17: A light entering the core 1 for example will reach and spread across the core-extension 20, and then coupled to the core 15 and 17. If the common core-extension 20 is wide and long enough, the output light distribution between the two cores 15 and 17 will be equal. The light split ratio will be independent of the wavelength and the polarization, which is advantageous aspects. A part or the whole body of the core-extension 20 may be surrounded by an air. However, a liquid or solid material may be added to the outside of the core-extension body 20, so long as the material is transparent and has the index of refraction lower than that of the core-extension 20.

Figure 6:
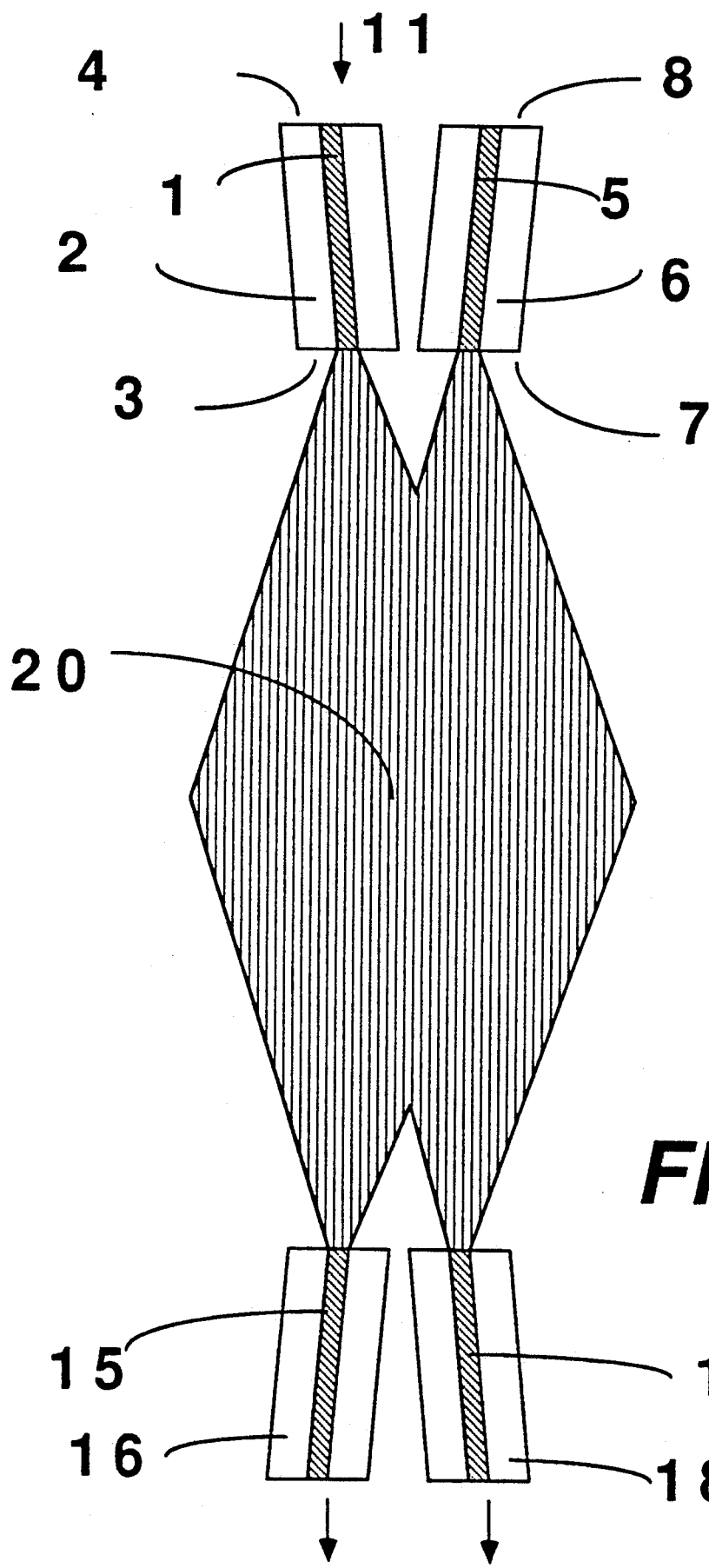
FIG. 6 shows that the fibers of FIG. 5 may deviate slightly from the perfect parallelism to enhance the light overlap and coupling.

The fibers in FIG. 5 may be slightly tilted as shown in FIG. 6 so as to increase the light overlap in the common core-extension 20. Throughout the present invention description, it will be understood that the fibers may be tilted slightly without changing the basic coupling mechanism.

Figure 11:
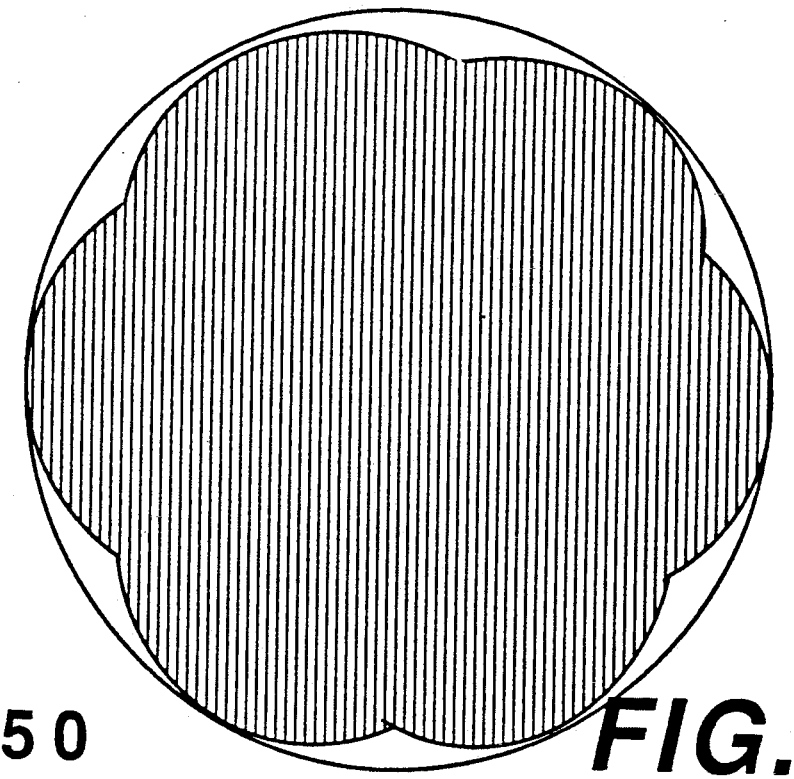
FIG. 11 shows one sectional view of the embodiment of FIG. 7 along Y-Y' for the case of two-dimensional arrangement of FIG. 10.

A straightforward extension from the two-by-two (2×2, meaning two input fibers and two output fibers) coupler structure of FIG. 5 produces a multi-port coupler, as shown in FIG. 11, six-by-six in this particular example. Any combinations such as 8×8, 8×16, 16×16, 1×16 are possible.

Figure 7:
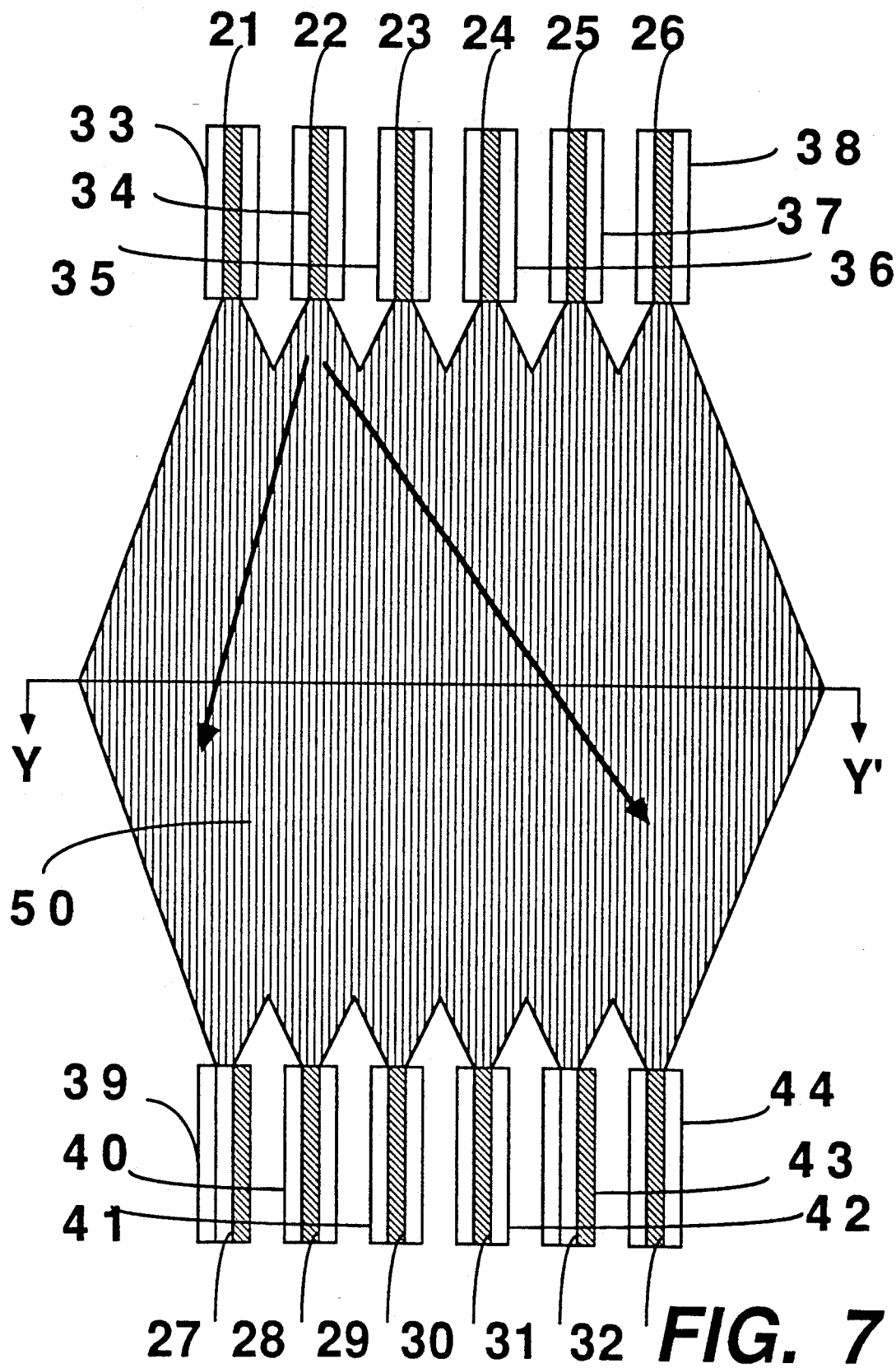
FIG. 7 shows the same as that in FIG. 5, except that the number of fibers is larger than two on each side of the coupler.
Figure 8:
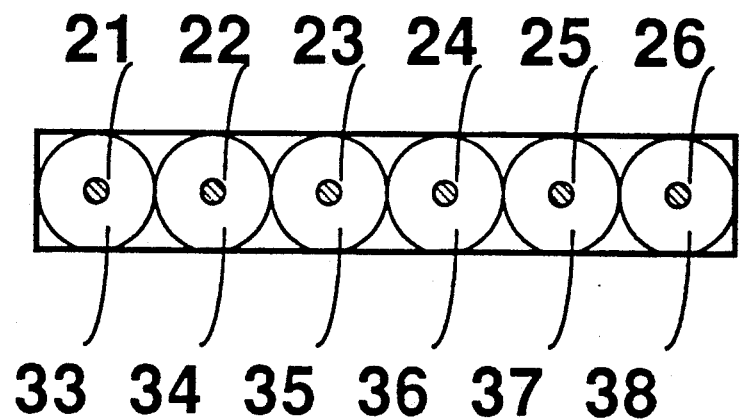
FIG. 8 shows the sectional view of the embodiment of FIG. 7 along X-X' for a case in which the fibers are arranged in an one-dimensional linear array.
Figure 9:
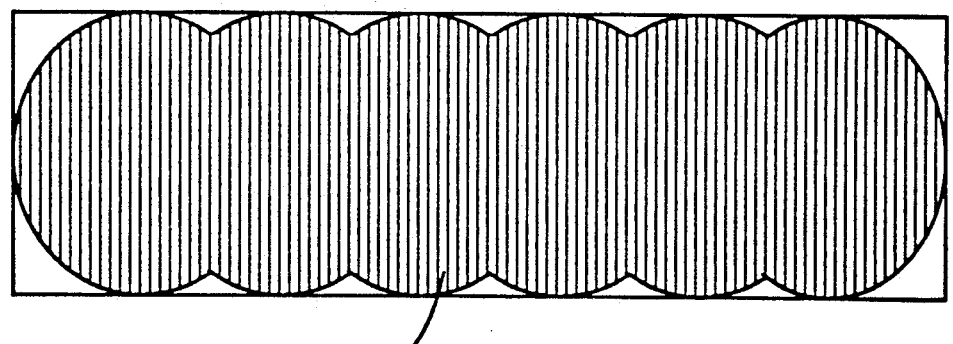
FIG. 9 shows the sectional view of the embodiment of FIG. 7 along Y-Y' for the case of one dimensional array of FIG. 8.
Figure 10:
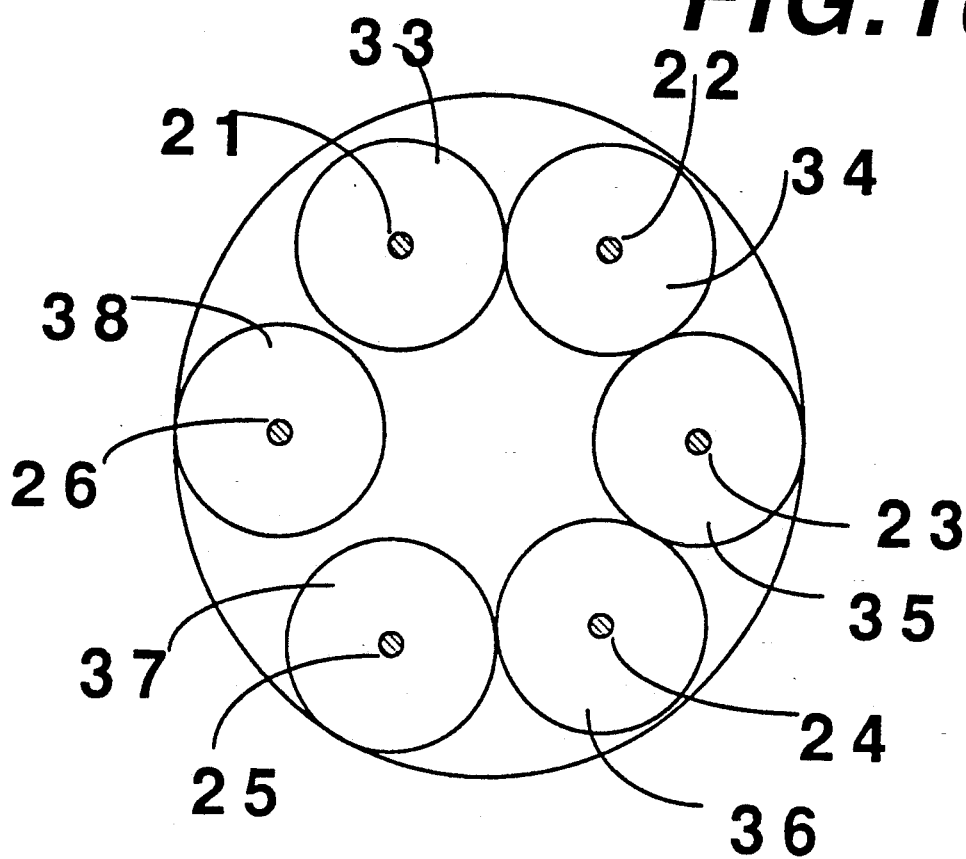
FIG. 10 shows one sectional view of the embodiment of FIG. 7 along X-X' for a case in which the fibers are arranged in a two-dimensional arrangement.

The multiple fibers in FIG. 7 may be arranged either as an linear array or in two-dimensional space. The sectional view across X-X' of FIG. 7 is shown in FIG. 8, and that across Y-Y' in FIG. 9, for the linear array arrangement. For the case of a two-dimensional arrangement, the sectional view across X-X' of FIG. 7 is shown in FIG. 10, and that across Y-Y' in FIG. 11. In either arrangement, there is no spatial overlap among the small fiber cores 21 through 26, and if a broad light beam impinges upon the sectional area X-X', the portion of the light falling on the fiber cores 21 through 26 is very small. On the other hand, the overlap is substantial in the sectional area Y-Y', ensuring a good coupling with low loss.

Figure 12:
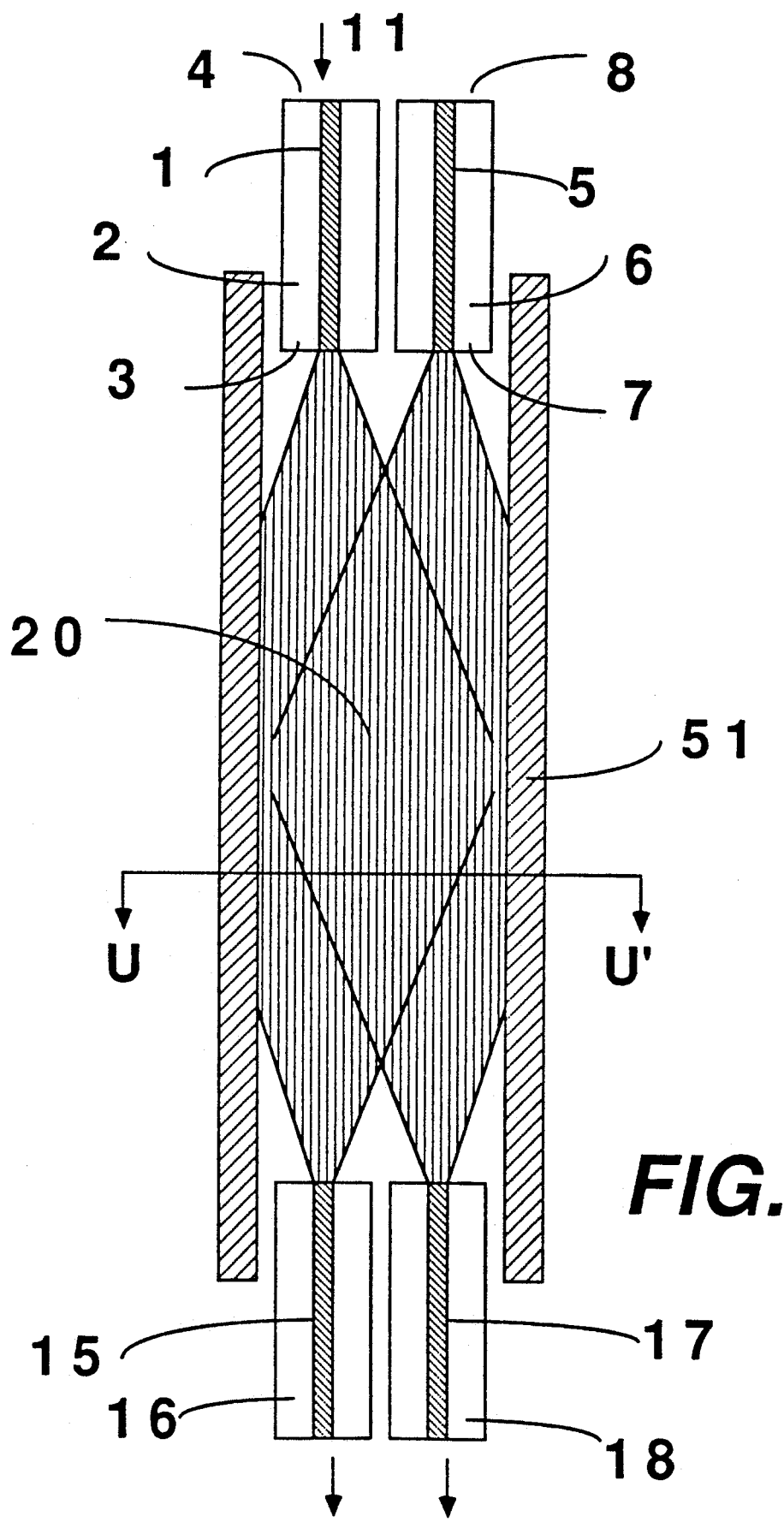
FIG. 12 shows the same as in FIG. 5, except that the common core-extension is housed inside a tubing.
Figure 13:
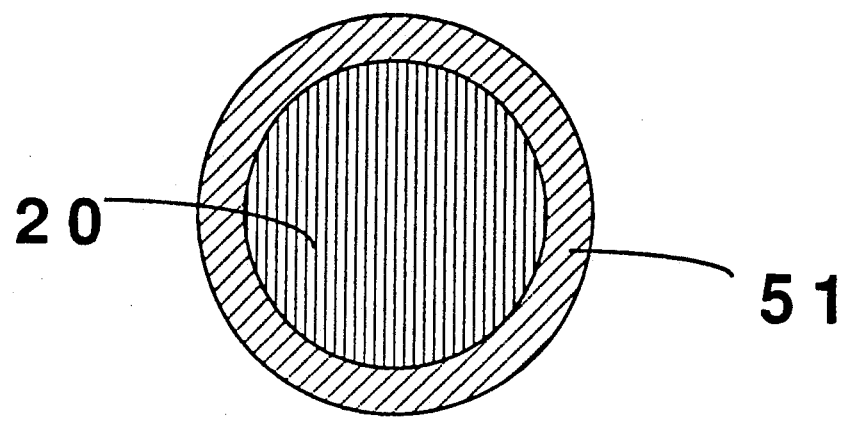
FIG. 13 shows the sectional view of the embodiment of FIG. 12 along U-U'.

Some variations of the basic coupler embodiment of FIG. 5 are shown in FIG. 12 through FIG. 16: FIG. 12 shows that a transparent tubing 51 is added to the basic coupler embodiment of FIG. 5. The material of the tubing 51 should have an index of refraction lower than that of the core-extension 20. Note that the inner dimension of the tubing 51 is narrower than the possible maximum diameter that the common-extension 51 would possess in the absence of the tubing 51. Thus the tubing 51 truncates the common-extension 20 along the inside wall. The cross-section of the tubing 51 may be of a circular, square, rectangular, or any other shape. FIG. 13 shows the sectional view across U-U' for a case of circular cross-section.

Figure 14:
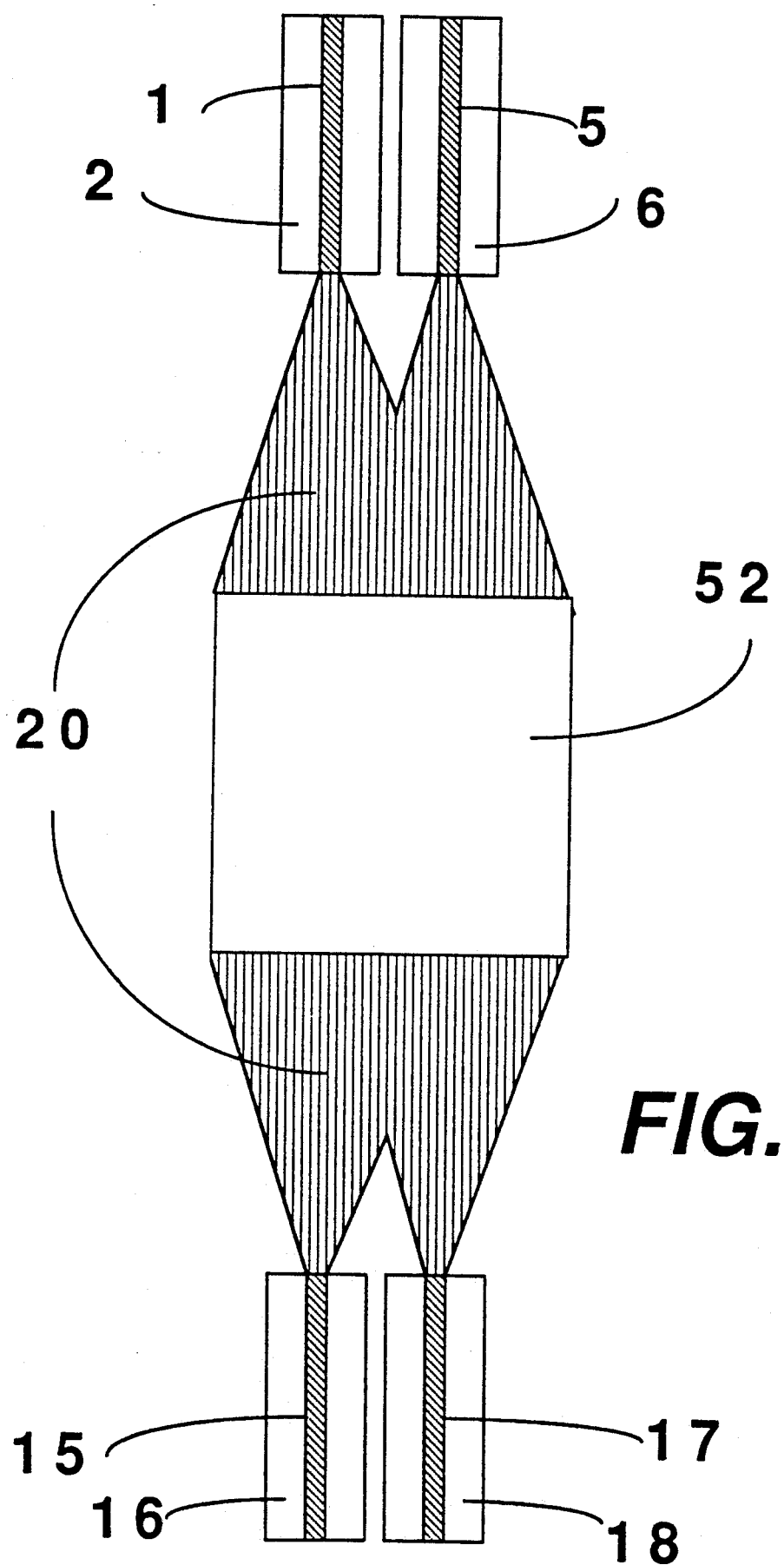
FIG. 14 shows the same as that of FIG. 5, except that a solid block is inserted in the middle of the core-extension.

FIG. 14 shows that a solid, transparent block 52 is inserted inside the common core-extension 20 to make the coupling length longer.

Figure 15:
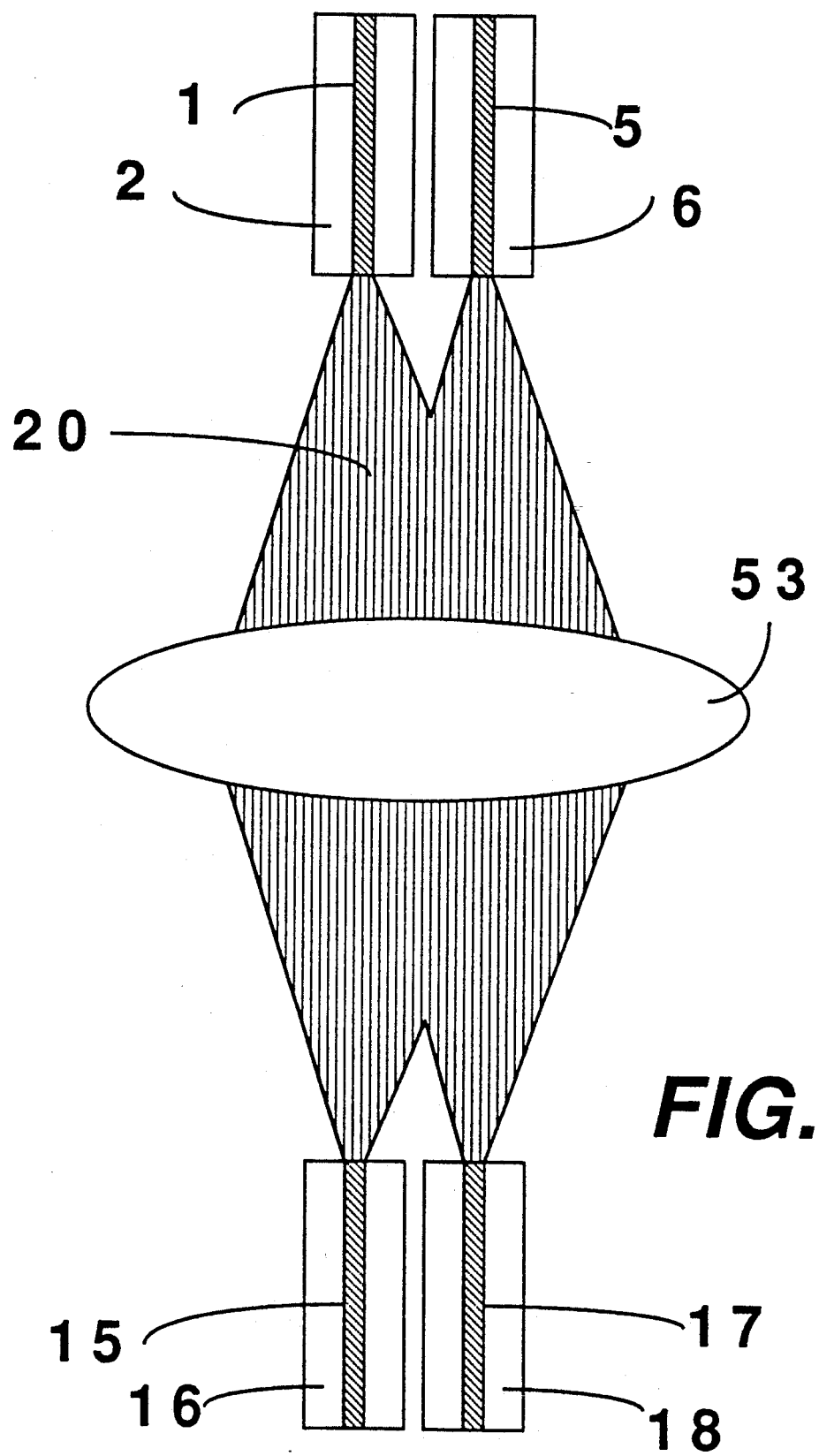
FIG. 15 shows the same as that of FIG. 5, except that a lens is inserted in the middle of the core-extension.

FIG. 15 shows that a focusing lens 53 is inserted inside the common core-extension 20 so as to increase the light overlap.

Figure 16:
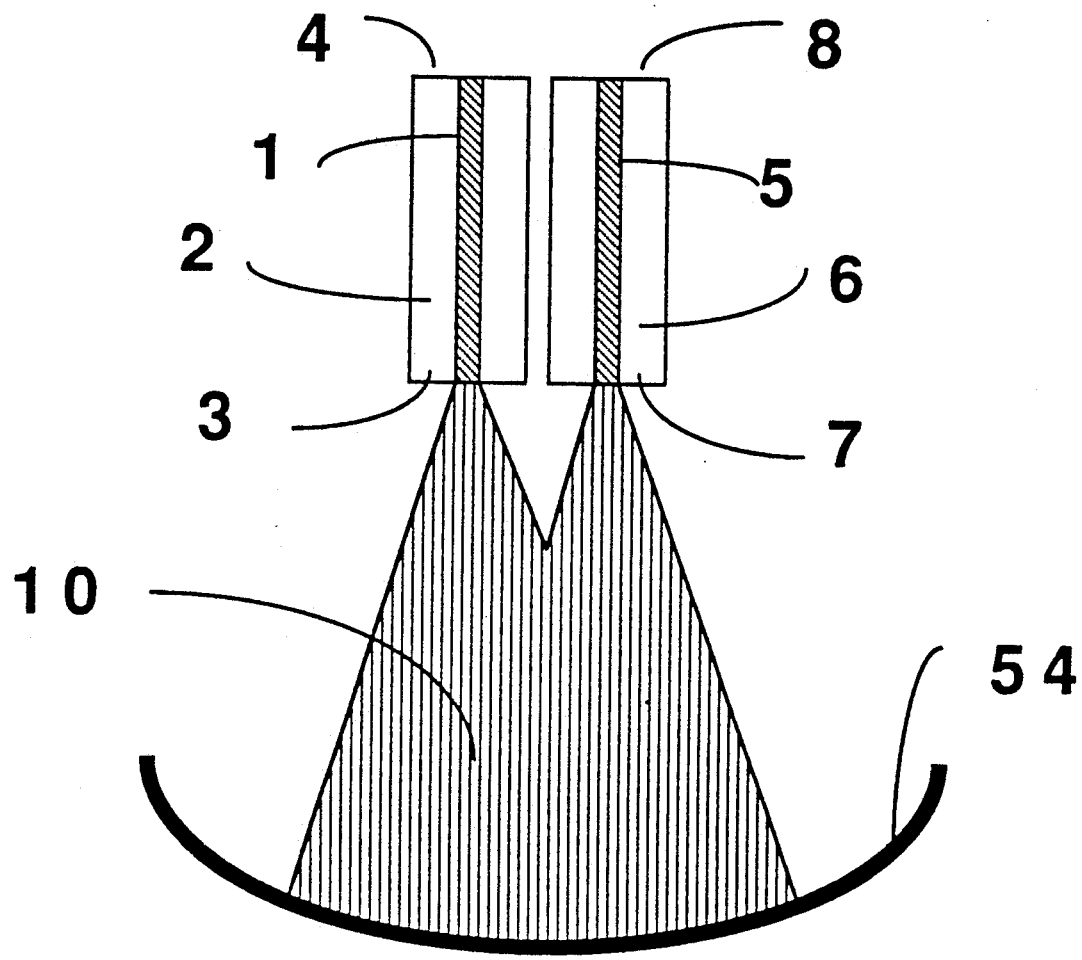
FIG. 16 shows the embodiment of FIG. 3 terminated by a light reflecting surface at the far end of the core-extension.

FIG. 16 shows that a reflective surface 54 is mounted on the common core-extension 10 of FIG. 3 so that light entering any of the two fiber cores 1 or 5 is mixed in the common core-extension 10, and then reflected back to be coupled to the both fiber cores 1 and 5, after a further light mixing in the common core-extension 10.

The core-extension embodiments presented above may be fabricated by precision molding techniques. A matched molded part may be fabricated to position the fibers so as to ensure proper alignment between the fiber end facets and the split input ports of the core-extensions. This fabrication technique will be especially useful for large-quantity production. The initial tooling cost will be high, but the unit-manufacturing cost will be low.

Figure 17:
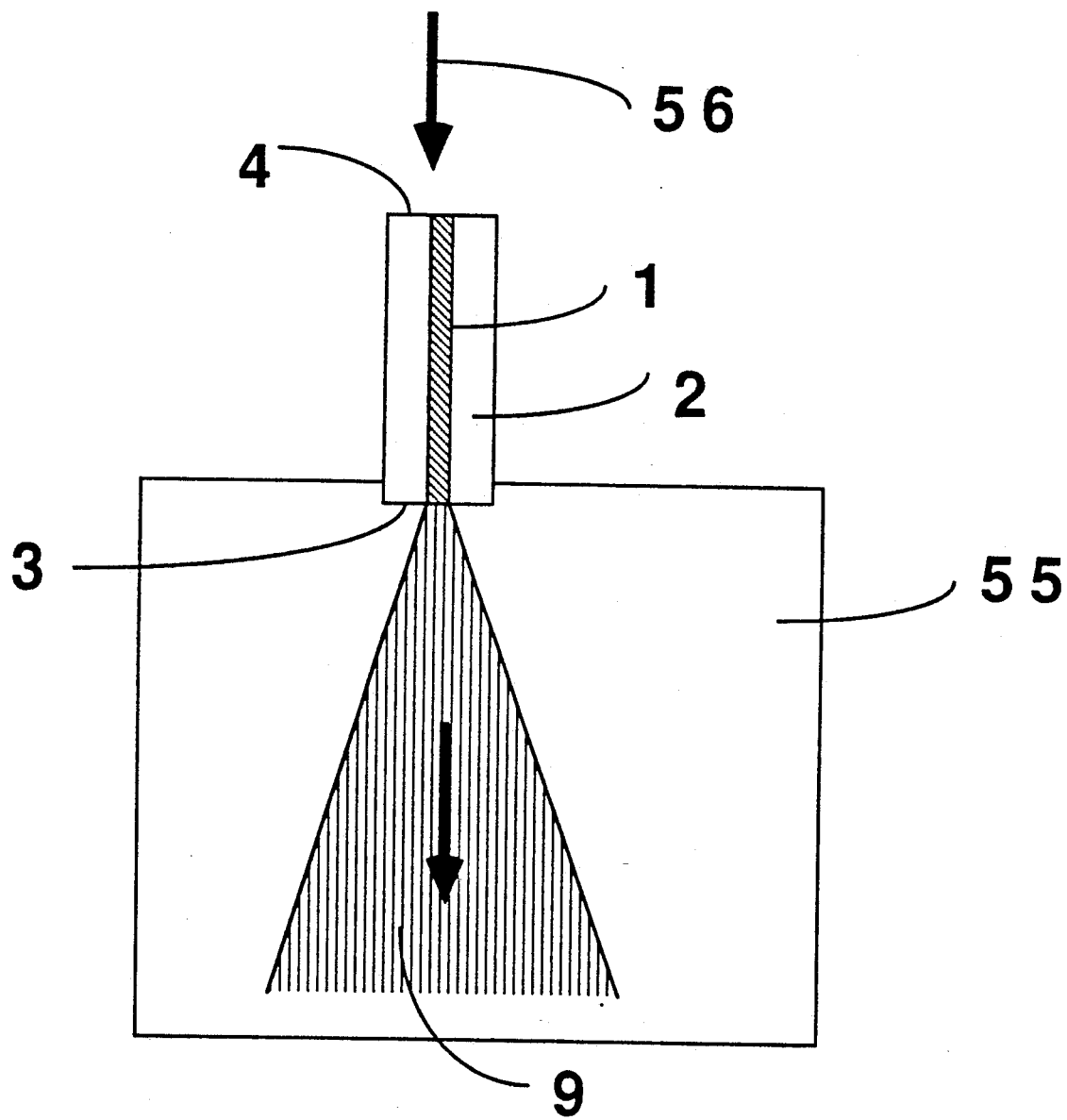
FIG. 17 shows the self-aligning fabrication method for the embodiment shown in FIG. 1, in which the end facet of the fiber is immersed in a photo-reactive material, emitting a light to expose and transform the material's characteristics within the diverging radiation envelop.

Another fabrication method is disclosed below. This technique possesses an tremendously advantageous feature, namely a perfect self-alignment between a fiber core end and a starting end of individual core-extension. To be low loss, the alignment requires better than one or two micron accuracy for the single-mode fiber case. Thus, this self-alignment technique will be especially useful for fabricating single-mode fiber couplers, which represents more than 90% of the coupler market volume. This fabrication technique can be readily practiced, with a low initial investment, to fabricate a low-cost single-mode fiber couplers in a simple and easy way. This method of constructing the couplers will be described herein as an accompanying "Method invention disclosure", using FIG. 17 through FIG. 22:

FIG. 17 shows the fiber core 1 and cladding 2 of FIG. 1 is immersed in a photo-reactive material 55. In this invention disclosure, "photo-reactive material" is defined as a substance the physical characteristics of which is influenced and transformed by a light exposure in such a way that the light exposure may be used to form the physical shape of the material body. Examples of such materials include a photoresist material that remains solid only when exposed by UV (ultraviolet) light and is dissolved otherwise by a solvent called photoresist developer; and an UV-cure epoxy that transforms from liquid to solid only in the region exposed by a light composed of certain wavelength components near 0.3 and 0.4 microns; a special glass raw material that solidifies when exposed by light; and an organic material the index of refraction of which changes upon light exposure.

In FIG. 17 a light 56 with a proper wavelength contents, usually UV light, enters the fiber core 1 from the input end 4 of the fiber to radiate out from the output end 3 with a certain divergence angle to expose the photo-reactive material 55 to a level enough for changing the material characteristics. The depth of the photo-reactive material 55 should be deep enough to ensure that the maximum width of the core-extension 9 being formed by the light exposure is larger than the fiber diameter, as specified earlier. This fabrication procedure will results in the embodiment shown in FIG. 1. The output end 3 does not have to be prepared flat: It may be modified to have a concave or convex surface to control the solid angle of the light cone 9.

Figure 18:
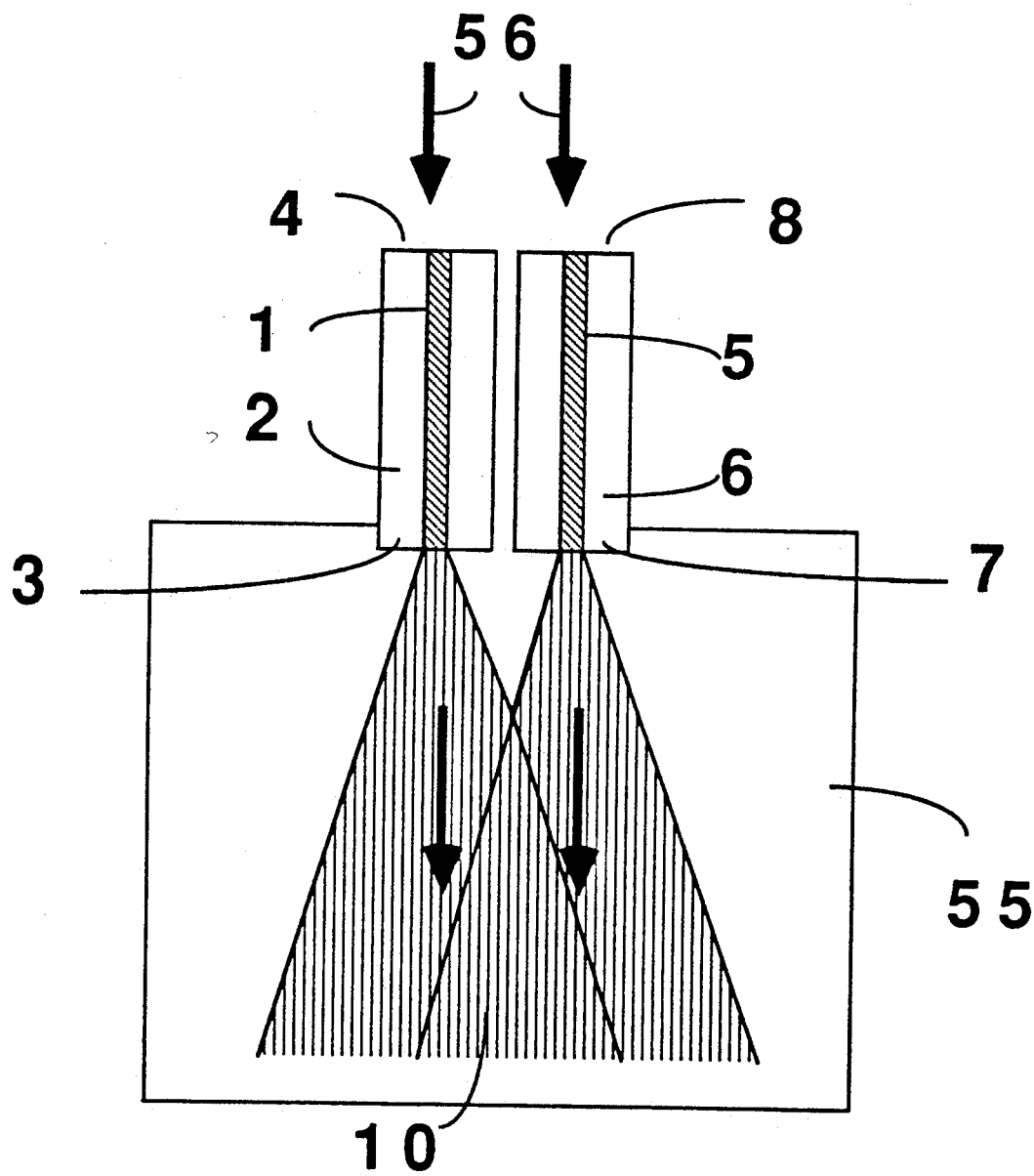
FIG. 18 shows the self-aligning fabrication method for the embodiment shown in FIG. 3, in which the end facets of the fibers are immersed in a photo-reactive material, emitting lights to expose and transform the material's characteristics within the diverging radiation envelops.

FIG. 18 illustrates in a schematic fashion a method of fabricating the basic light mixer embodiment of the present invention shown in FIG. 3. The fiber 2 shown in FIG. 17 is accompanied by a neighboring fiber 6 located in a close proximity, and the both fiber cores 1 and 5 receive the exposure light 56. The lights emerging from the output ends 3 and 7 overlap to form a common core-extension 10, resulting in the light mixer embodiment shown in FIG. 3.

Figure 19:
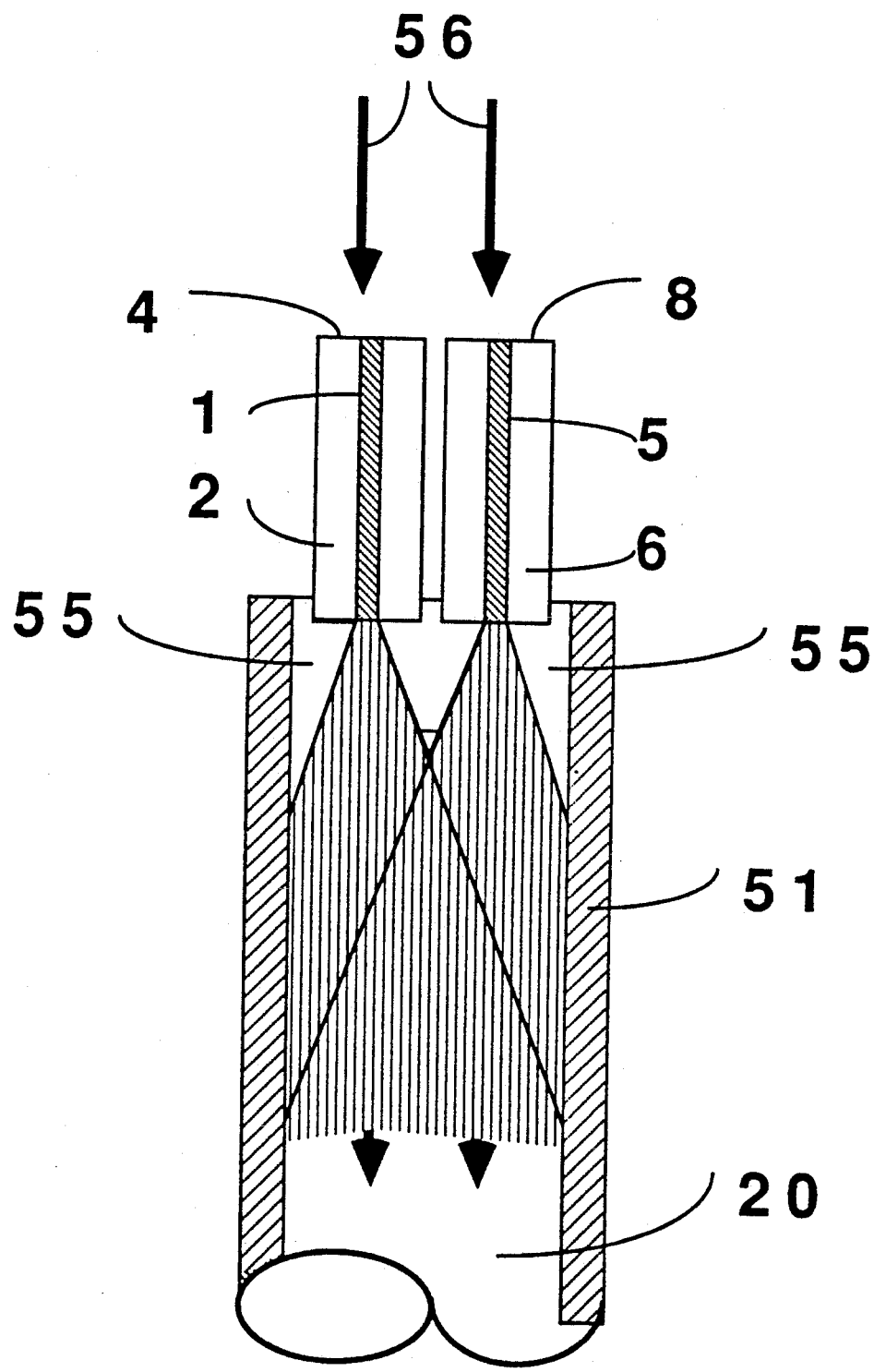
FIG. 19 shows the self-aligning fabrication method for the embodiment shown in FIG. 12, in which the tubing contains a photo-reactive material that transforms its characteristics upon the radiative exposure at a proper wavelength, while the end facets of the fibers are immersed in the photo-reactive material to provide the required exposure.

FIG. 19 shows a manufacturing method for the coupler embodiment of FIG. 12, in which the container 51 holding the photo-reactive material 55 becomes a part of the coupler embodiment. In this case the inner diameter of the container 51 is narrower than the maximum diameter of the common core-extension 20. The light exposure is done in the same way as in FIG. 18. The resulting structure, when the same arrangement is duplicated at the opposite end, becomes the embodiment of FIG. 12.

Figure 20:
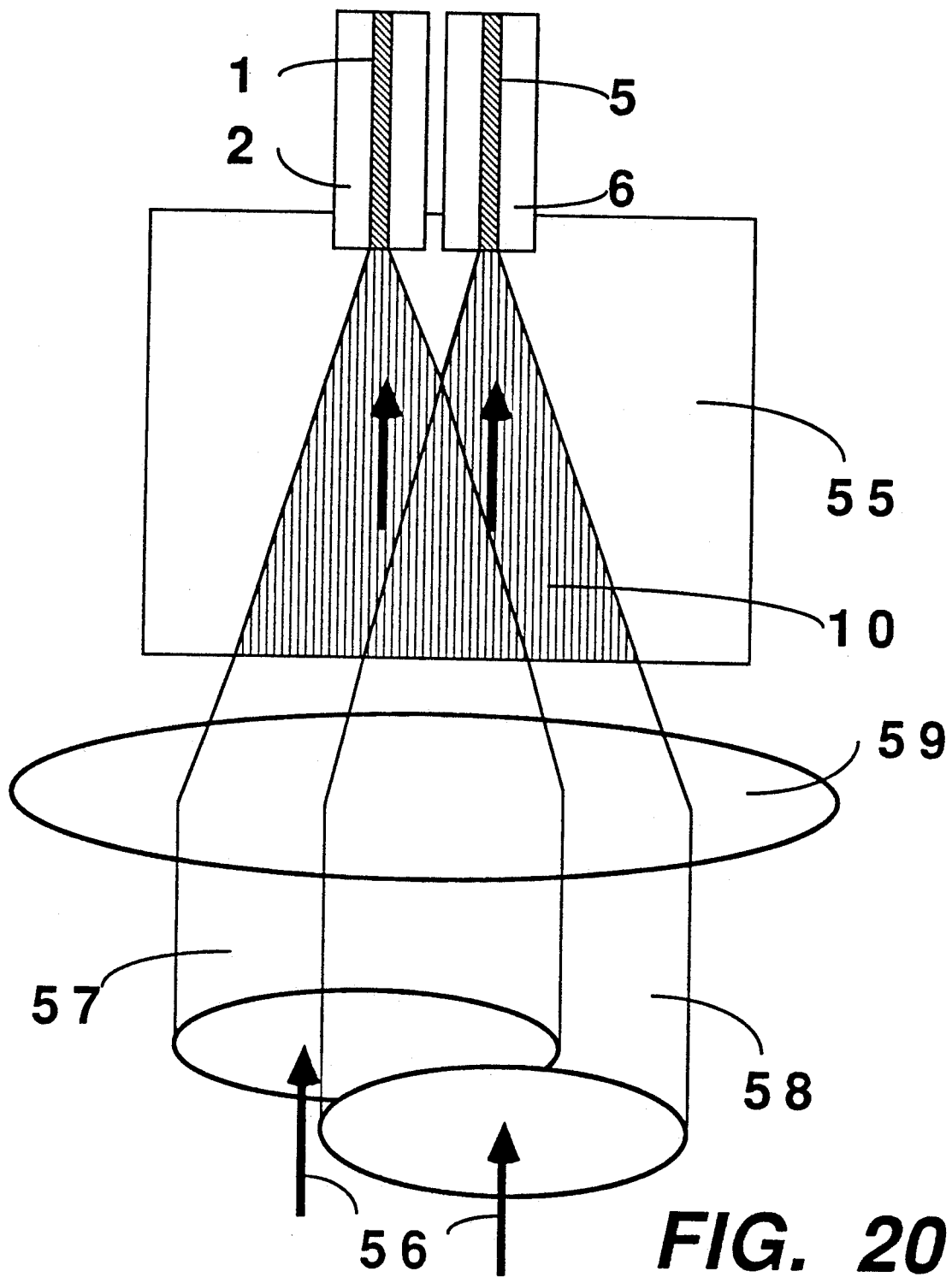
FIG. 20 shows the same as in FIG. 18, except that the exposing light comes from the outside of the fibers.

The light 56 for exposing the photo-reactive material 55 does not have to come from the fiber side: As shown in FIG. 20, the exposing beam 56 may come from the other side to be focused onto the cores 1 and 5 through a lens 59. This method will be useful when the cores 1 and 5 are not accessible, or when the cores are opaque to the exposing light. The method may be useful especially for couplers with large cores made of plastic, which suffers a great transmission loss at the UV wavelength region.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An optical fiber mixer comprising;
   a plurality of light guiding cores with the end facets perpendicular to the light propagation direction, being laid substantially in the parallel orientation in a close proximity;
   a plurality of core-extensions for the light guiding cores, each of the light guiding cores having one core-extension;
   wherein the individual core-extensions are built onto the core end facets in a shape of the diverging horn-like structure, extending the waveguide effect substantially beyond the end facets of the cores, with the sectional area increasing gradually as the individual core-extensions extend further from the core end facets over a sufficient distance so as to make the maximum diameter of the each horn-like structure at the farthest end larger than the distance between two neighboring cores, thus allowing the individual core-extensions from the individual cores to merge together to form a common core-extension for light mixing, and have an index of refraction greater than that of the surrounding medium so as to possess light confining function.

2. The invention according to claim 1 wherein the cores are arranged in a linear array.

3. The invention according to claim 1 wherein the cores are arranged in a two-dimensional space.

4. The invention according to claim 1, wherein the common core-extension is housed in a transparent tubing the inner dimension of which is narrower than the maximum possible diameter that the common core-extension would have in the absence of the tubing, and has an index of refraction lower than that of the core-extension.

5. The invention according to claim 1, wherein the far end of the common core-extension is mated to a light-reflecting surface.

6. The invention according to claim 1, wherein the individual core-extensions and the common core-extension are made of molded parts.

7. The invention according to claim 1, wherein the individual core-extensions and the common core-extension are made of photo-reactive material the physical characteristics of which can be altered and shaped by a photo-exposure.

8. The invention according to claim 7, wherein the photo-reactive material is an UV-cure epoxy.

9. The invention according to claim 7, wherein the photo-reactive material is a photoresist material.

10. The invention according to claim 7, wherein the photo-reactive material is an organic material the refractive index of which is altered by a light exposure.

11. The invention according to claim 7, wherein the photo-reactive material is a glass raw material that alters its physical characteristics by a light exposure.

12. A method of manufacturing the core-extensions of the optical fiber mixer as defined in claim 7, wherein the first end facets of the cores are immersed in the photo-reactive material the physical characteristics of which can be altered and shaped by a photo-exposure, and the photo-reactive material is exposed by a light within the space defined for the individual core-extensions and the common core-extension.

13. The invention according to claim 12, in which the light for exposing the photo-reactive material enters the second ends of the cores and then radiates from the first ends of the cores with the characteristic divergence angle, thus forming the shape of the individual core-extensions and the common core-extension as defined.

14. The invention according to claim 1 wherein each of the light guiding core is surrounded by a cladding the thickness of which is reduced locally so as to minimize the distance between two neighboring cores.

15. An optical coupling structure for extending an waveguide core comprising;
a light guiding core with an end facet perpendicular to the light propagation direction;
and a core-extension for the light guiding core;
wherein the core-extension is made of a photo-reactive material the physical characteristics can be altered and shaped by a photo-exposure, and is built on the end facet of the core following the shape of the diverging radiation pattern of light that stretches over a distance far enough to make the maximum diameter at the farthest end substantially larger than the core diameter, and has an index of refraction greater than that of the surrounding medium so as to possess light confining function.

16. An optical fiber coupler comprising;
the first set of a plurality of light guiding cores with the end facets perpendicular to the light propagation direction, being laid substantially in the parallel orientation in a close proximity; and having a plurality of core-extensions for the light guiding cores, each of the light guiding cores having one core-extension;
the second set of a plurality of light guiding cores with the end facets perpendicular to the light propagation direction being laid substantially in the parallel orientation in a close proximity; and having a plurality of core-extensions for the light guiding cores, each of the light guiding cores having one core-extension;
wherein the first set of light guiding cores and the second set of light guiding cores are positioned on a common axis in a face-to-face fashion, with the core-extensions of the first set and the core-extensions of the second set located in the middle between the first and the second sets of light guiding cores; and within each of the first and second sets of light guiding cores the individual core-extensions are built onto the core end facets in a shape of the diverging horn-like structure, extending the waveguide effect substantially beyond the end facets of the cores, with the sectional area increasing gradually as the individual core-extensions extend further from the core end facets over a sufficient distance so as to make the maximum diameter of the each horn-like structure at the farthest end larger than the distance between two neighboring cores, thus allowing the individual core-extensions from the individual cores to merge together to form a common core-extension for light mixing, and have an index of refraction greater than that of the surrounding medium so as to possess light confining function; and the common core-extensions of the first set of light guiding cores and the common core-extensions of the second set of light guiding cores are laid on the common axis facing each other.

17. An optical fiber coupler comprising;
the first set of a plurality of light guiding cores with the end facets perpendicular to the light propagation direction, being laid substantially in the parallel orientation in a close proximity; and having a plurality of core-extensions for the light guiding cores, each of the light guiding cores having one core-extension;
the second set of a plurality of light guiding cores with the end facets perpendicular to the light propagation direction, being laid substantially in the parallel orientation in a close proximity; and having a plurality of core-extensions for the light guiding cores, each of the light guiding cores having one core-extension;
and a light transmitting medium;
wherein the light transmitting medium, the first set of light guiding cores, and the second set of light guiding cores are positioned on a common axis, with the core-extensions of the first set of light guiding cores located on the one side of the light transmitting medium and the core-extensions of the second set of light guiding cores located on the other side of the light transmitting medium; and within each of the first and second sets of light guiding cores the individual core-extensions are built onto the core end facets in a shape of the diverging horn-like structure, extending the waveguide effect substantially beyond the end facets of the cores, with the sectional area increasing gradually as the individual core-extensions extend further from the core end facets over a sufficient distance so as to make the maximum diameter of the each horn-like structure at the farthest end larger than the distance between two neighboring cores, thus allowing the individual core-extensions from the individual cores to merge together to form a common core-extension for light mixing, and have an index of refraction greater than that of the surrounding medium so as to possess light confining function; and the common core-extensions of the first set of light guiding cores and the common core-extensions of the second set of light guiding cores are laid on the common axis facing each other with the light transmitting medium located in-between.

18. The invention according to claim 17, wherein the light transmitting medium is a solid transparent block.

19. The invention according to claim 17, wherein the light transmitting medium is a lens.

* * * * *